United States Patent [19]
Robbins et al.

[11] Patent Number: 5,718,810
[45] Date of Patent: Feb. 17, 1998

[54] METHANOL RECOVERY USING EXTRACTIVE DISTILLATION

[75] Inventors: Lanny A. Robbins; Von G. Landon, both of Midland, Mich.

[73] Assignee: The Dow Chemical Company, Midland, Mich.

[21] Appl. No.: 618,640

[22] Filed: Mar. 19, 1996

[51] Int. Cl.$^6$ .................. B01D 3/00; B01D 3/10
[52] U.S. Cl. .................. 203/76; 203/83; 203/85; 203/96; 203/DIG. 23
[58] Field of Search .................. 203/76, 83, 18, 203/DIG. 23, 85, 96; 568/913, 917; 162/189, 201

[56] References Cited

U.S. PATENT DOCUMENTS

| | | | |
|---|---|---|---|
| 2,198,651 | 4/1940 | Bludworth | 202/42 |
| 2,321,748 | 6/1943 | Hopkins et al. | 202/41 |
| 2,551,593 | 5/1951 | Gilliland et al. | 202/39.5 |
| 2,551,625 | 5/1951 | Morrell et al. | 202/39.5 |
| 2,588,272 | 3/1952 | Morrell et al. | 202/39.5 |
| 2,610,141 | 9/1952 | Drout, Jr. | 202/39.5 |
| 2,669,541 | 2/1954 | Catterall | 202/39.5 |
| 2,751,337 | 6/1956 | Goddin, Jr. et al. | 202/39.5 |
| 3,434,937 | 3/1969 | Elliott et al. | 203/DIG. 23 |
| 3,764,461 | 10/1973 | Baierl | 162/16 |
| 4,013,521 | 3/1977 | Scott | 203/85 |
| 4,111,743 | 9/1978 | Ronnholm | 162/16 |
| 4,149,940 | 4/1979 | Pinto | 203/25 |
| 4,210,495 | 7/1980 | Pinto | 203/22 |
| 4,592,806 | 6/1986 | Ilgner et al. | 203/71 |
| 4,744,869 | 5/1988 | Saito et al. | 203/82 |
| 5,340,446 | 8/1994 | Nelson et al. | 203/56 |
| 5,437,711 | 8/1995 | Kaplin et al. | 95/161.82 |

OTHER PUBLICATIONS

G.A. Smook, "Kraft Pulping", *Handbook for Pulp & Paper Technologies*, (1982) pp. 66–75.

Primary Examiner—Nina Bhat

[57] ABSTRACT

A method for recovering methanol from sulfur-based wood pulping process vapors, which contain at least methanol and dimethyl disulfide. The method involves three steps. The first step consists of introducing the vapors into a first distillation tower at a vapor introduction point. The second step consists of introducing water into the first tower at a point above the vapor introduction point. The third step consists of heating liquid which is in the first tower below the vapor introduction point so that a liquid stream flows from the bottom of the first tower and a gas stream flows from the top of the first tower. The liquid stream contains most of the methanol originally in the vapors. The gas stream contains most of the dimethyl disulfide originally in the vapors. The liquid stream can then be distilled in a second distillation tower by conventional distillation to produce dry methanol. The first and third steps can be combined by introducing sufficiently heated vapors. When the vapors contain more than sixty percent water, then there need be only two steps. The first step consists of introducing the vapors into a first distillation tower at a vapor introduction point. The second step consists of heating liquid which is in the first tower below the vapor introduction point so that a liquid stream flows from the bottom of the first tower and a gas stream flows from the top of the first tower.

28 Claims, 3 Drawing Sheets

5,718,810

METHANOL RECOVERY USING EXTRACTIVE DISTILLATION

BACKGROUND OF THE INVENTION

This invention relates to the recovery of methanol from sulfur-based wood pulping operations using extractive distillation. Such sulfur-based wood pulping operations include chemimechanical pulping, neutral sulfite semi-chemical (NSSC) pulping, and chemical pulping, which can be either the sulfite pulping process or the kraft pulping process. The instant invention is particularly useful for the kraft pulping process. The various pulping processes, including the kraft process, are described in detail in "Handbook For Pulp & Paper Technologists" by G. A. Smook.

Generally, in the preparation of wood pulp useful in paper-making operations, wood chips are treated, either chemically or mechanically, to separate the cellulose fibers. In the kraft pulping process, the predominant pulping process in the industry, wood chips are treated with a cooking liquor containing sodium hydroxide, sodium sulfide and sodium carbonate. This cooking liquor is known as "white liquor". The chemicals attack non-fibrous materials present in the wood chips, reacting with lignin, which is the binder in the wood that holds fibers together, to form water soluble compounds, thereby allowing separation of the fibrous, or cellulose, portion of the chips.

The treatment of the wood chips normally takes place in a digester over an extended period of time and at an elevated temperature. The exact time, temperature and pressure depend, to a considerable extent, on the species of wood and the amount of chemicals employed. To maintain a constant temperature and pressure during the chemical treatment, vapors can be periodically released from the digester. Also, before the pulp is discharged from the digester, the temperature and pressure can be lowered by releasing additional vapors. These vapors, together, are referred to as digester relief gases. The water portion of these vapors is often condensed and the condensate sent to a secondary treatment facility, usually aeration ponds, before leaving the mill as a liquid effluent.

The pulp and spent kraft pulping liquor, also known as "black liquor", can be removed from the digester by being blown out at low pressure. During their removal additional vapors are released which are commonly referred to as digester blow gases. The digester relief gases, digester blow gases and black liquor contain chemicals produced during the pulping operation including, for example, methanol, ethanol, acetone, dimethyl disulfide, dimethyl sulfide, methyl mercaptan, crude turpentine and hydrogen sulfide. The type and amount of chemicals in any given sample depends on many factors, including the species of wood, treatment chemicals, and cooking conditions employed.

After the fibrous pulp is separated, the black liquor is evaporated to recover the sodium salts present therein for reuse in subsequent pulping operations. The evaporator vapors from this treatment contain various chemicals produced during the pulping operations.

The recovery of some of the useful by products from the liquors and condensates produced during kraft pulping operations has been explored. For example, the recovery and separation of organic chemicals from sulfur-containing compounds and crude turpentine is described in U.S. Pat. No. 3,761,461.

Most pulp mills use air or steam stripping to remove most of the organics from the liquors and condensates. The bottoms stream from the stripper is recycled or sent to a waste-water treatment plant to remove any unstripped organics. The overhead vapors are passed to a condenser. The condensate is refluxed to the column, and the uncondensed material is removed as distillate. This distillate is mixed with other streams from the process and burned in a lime kiln to absorb the sulfur dioxide formed by oxidation of the sulfur compounds. This distillate can also contain methanol.

In addition to the pulping facilities, many paper manufacturers employ bleaching processes that utilize methanol. The methanol used in the bleaching processes is expensive. It would be an advance in the art of paper manufacturing if the methanol present in the above discussed vapors could be recovered and used in the bleaching processes. However, the presence of azeotropes complicates effective separation by the conventional distillation process.

SUMMARY OF THE INVENTION

The instant invention is a solution to the above identified problem of wasted methanol. The instant invention is a method for recovering methanol from sulfur-based wood pulping operations using extractive distillation. The recovered methanol can then be recycled for use in bleaching processes or other applications.

The instant invention is a method for recovering methanol from sulfur-based wood pulping process vapors, which contain at least methanol and dimethyl disulfide. The method comprises three steps. The first step consists of introducing the vapors into a first distillation tower at a vapor introduction point of the first tower, the first tower containing a liquid below the vapor introduction point. The second step consists of introducing water into the first tower at a point above the vapor introduction point so that an aqueous phase is present above the vapor introduction point. The third step consists of heating the liquid in the first tower below the vapor introduction point so that a liquid stream flows from the bottom of the first tower and a gas stream flows from the top of the first tower, the liquid stream containing most of the methanol originally in the vapors, the gas stream containing most of the dimethyl disulfide originally in the vapors. The liquid stream can then be distilled in a second distillation tower using conventional distillation to recover the methanol. The method is particularly useful for recovering methanol from kraft pulping process vapors.

In another embodiment of the invention, when the vapors contain more than sixty percent water, the invention comprises only two steps. The first step consists of introducing the vapors into a first distillation tower at a vapor introduction point of the first tower, the first tower containing a liquid below the vapor introduction point. The second step consists of heating the liquid in the first tower below the vapor introduction point so that a liquid stream flows from the bottom of the first tower and a gas stream flows from the top of the first tower, the liquid stream containing most of the methanol originally in the vapors, the gas stream containing most of the dimethyl disulfide originally in the vapors. The liquid stream can then be distilled in a second distillation tower using conventional distillation to recover the methanol.

In yet another embodiment the invention also comprises only two steps. The first step is to introduce water into a first distillation tower at a water introduction point of the tower so that an aqueous phase is present above the water introduction point of the tower. The second step is to introduce the vapors into the first distillation tower at a point below the water introduction point of the tower, the vapors being sufficiently hot so that a liquid stream flows from the bottom of the first tower and a gas stream flows from the top of the first tower, the liquid stream containing most of the methanol originally in the vapors, the gas stream containing most of the dimethyl disulfide originally in the vapors. The liquid stream can then be distilled in a second distillation tower using conventional distillation to recover the methanol.

DETAILED DESCRIPTION OF THE INVENTION

Figure 1:
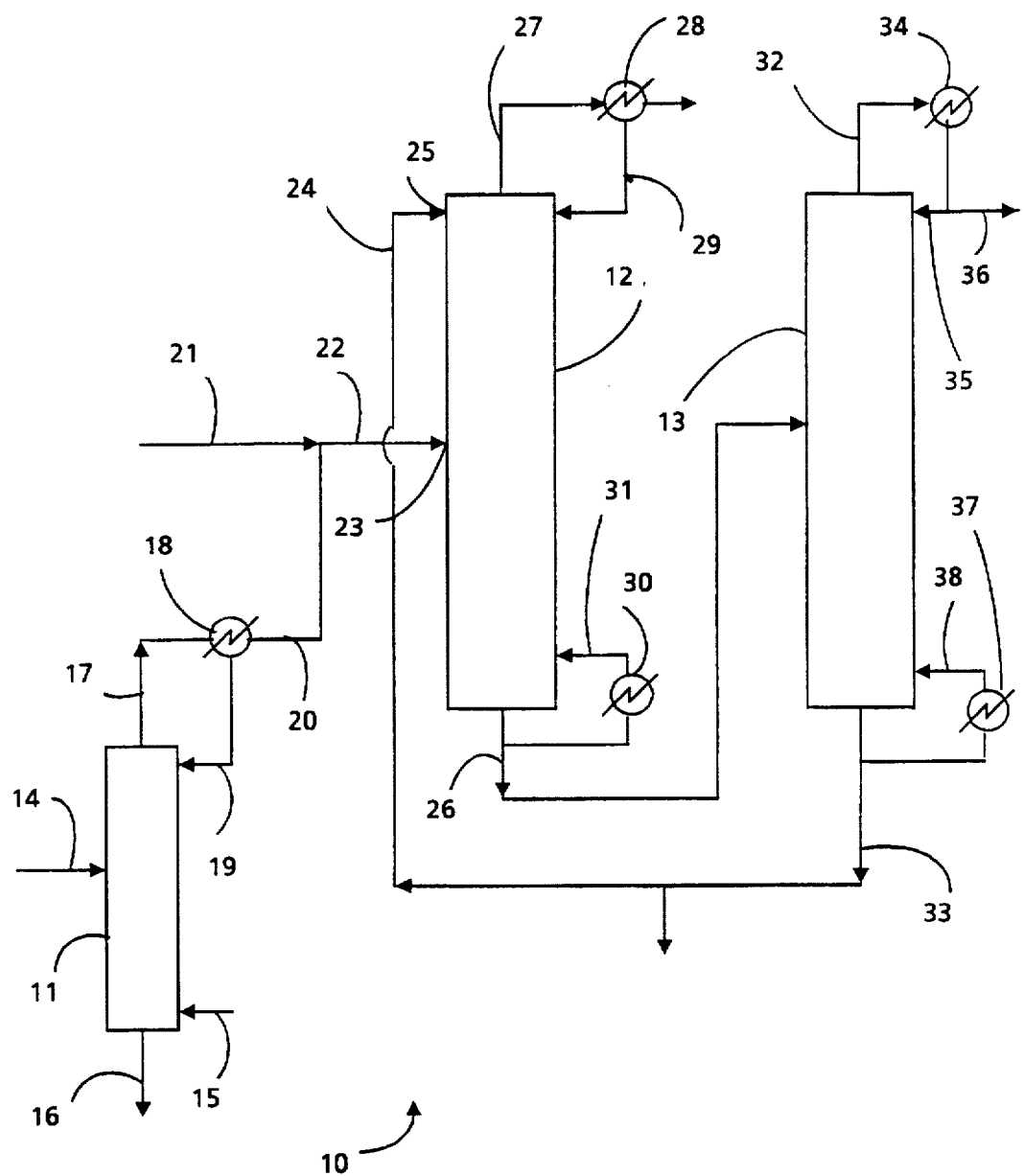
FIG. 1 is a schematic drawing of an apparatus that can be used to practice the instant invention, which drawing shows a first distillation tower.

Referring now to FIG. 1, therein is shown a schematic drawing of a process 10 that can be used to practice the instant invention. Preferably, the process 10 involves three unit operations: stripping in a stripper 11, extractive distillation in a first distillation tower 12, and conventional distillation, also known as methanol drying, in a second distillation tower 13. The instant invention will be described as it relates to the kraft process.

The stripper 11 is an air stripper or a steam stripper that is used to remove organics from liquors and condensates in a pulp mill. The stripper 11 can be a packed stripper or a plate stripper. The feed 14 to the stripper 11 is comprised of, for example, condensed vapors from the pulping process, and the feed 14 can also include other liquors and condensates as well. The stripping gas 15 can be air or steam. The stripping gas 15 is fed to the bottom of the stripper 11 so that the stripping gas 15 flows countercurrently to the feed 14 inside the stripper 11. The stripping gas 15 is fed to the stripper 11 at a sufficient rate to separate the feed 14 into a bottoms stream 16 and an overhead vapor 17. The bottoms stream 16 contains water and any unstripped organics. The bottoms stream 16 can be fed to a waste treatment plant or can be recycled to the pulp mill. The overhead vapor 17 contains organics that were stripped from the feed 14. The overhead vapor is sent to a condenser 18, where the overhead vapor is partially condensed. The condensed portion is sent back to the stripper as reflux 19. The uncondensed portion remains in the vapor phase as distillate 20.

The distillate 20 can be mixed with other gases 21 from the kraft pulping process to form vapors 22. The vapors 22 are fed to a vapor introduction point 23 of the first distillation tower 12. The term "vapors" is defined herein and in the claims to include digester relief gases, digester blow gases, vapors from concentrating the black liquor, as well as other vapors from the pulp mill. The vapors can be in vapor form or can be condensed so that the vapors are in liquid form. The vapors can include water, methanol, dimethyl disulfide, ethanol, terpenes, phenols, and other hydrocarbons liberated from the wood.

The vapors 22 are fed to the first distillation tower 12 at a vapor introduction point 23. The vapor introduction point can be anywhere between the top and the bottom of the first tower 12, including the bottom of the first tower 12. The precise vapor introduction 23 point depends upon the operating conditions and the number of stages within the first distillation tower 12. For example, in a fifteen foot tower with thirty theoretical stages, the vapor introduction point 23 might be at the twenty-fourth stage, or three feet from the bottom of the tower. More detail in determining the appropriate size and number of stages in an extractive distillation tower is found in "Chemical Engineers' Handbook", by Perry & Chilton.

Water 24 is fed to the first tower 12 at a water introduction point 25, which is located above the vapor introduction point 23. The water introduction point 25 is preferably at the very top of the first tower 12, but can be at any other point above the vapor introduction point 23. The precise water introduction point 25 depends upon the operating conditions.

In the first distillation tower 12, extractive distillation is performed so that water and most of the methanol originally in the vapors 22 come out of the bottom of the tower as a liquid stream 26, and most of the other compounds originally in the vapors 22, including dimethyl disulfide, come out of the top of the first tower 12 as a gas stream 27.

Extractive distillation by definition refers to those processes where a low volatility solvent is introduced above the feed to cause a change in the relative volatility of the key components so that they can be separated. The alteration of volatilities is necessary because of the presence of azeotropes which prevent effective separation using conventional distillation. A particular solvent is usually selected such that it boils far above the feed components so that the formation of new azeotropes is impossible. However, in the instant invention, water is the solvent. The boiling point of water is below many of the components in the vapors. For example, the boiling point of dimethyl disulfide at atmospheric pressure is 109.8 degrees centigrade, nearly ten degrees above the boiling point of water. The boiling points at atmospheric pressure for various pure materials commonly found in the vapors 22 are listed in Table I.

TABLE I

| Compound | Boiling Point (°C.) |
| --- | --- |
| hydrogen sulfide | −60.3 |
| methyl mercaptan | 6.0 |
| acetaldehyde | 20.2 |
| dimethyl sulfide | 37.3 |
| acetone | 56.5 |
| methanol | 64.7 |
| ethanol | 78.3 |
| methyl ethyl ketone | 79.6 |
| isopropyl alcohol | 82.5 |
| water | 100.0 |
| dimethyl disulfide | 109.8 |
| methyl isobutyl ketone (MIBK) | 114.0 |
| anisole | 153.6 |
| α-pinene | 156.5 |
| β-pinene | 166.3 |
| m-cymene | 175.2 |
| limonene | 176.8 |
| p-cymene | 177.1 |
| o-cymene | 178.4 |
| α-terpineol | 217.5 |

Surprisingly, even though many of the materials in the vapors have boiling points higher than water, including dimethyl disulfide, these high boiling materials can still be separated from methanol using the instant invention.

The successful use of extractive distillation depends upon the relative volatilities of the components to be separated. Of all the compounds commonly found in kraft pulping process vapors, the compound with the closest relative volatility to methanol is ethanol. Therefore, ethanol is the most difficult compound to separate from methanol.

Ethanol can be separated from methanol using extractive distillation when the volatility of ethanol is greater than the volatility of methanol. In other words, the relative volatility of ethanol to methanol needs to be greater than one in order to separate ethanol from methanol. Therefore, an aqueous phase must be present above the vapor introduction point 23, or, in other words, sufficient water must be present above the vapor introduction point to cause the relative volatility of ethanol to methanol to be greater than one, which is believed to best occur when the concentration of water present is at least sixty weight percent. Thus, when ethanol is present in the vapors 22, the aqueous phase must contain at least sixty weight percent water in order to separate the ethanol from the methanol.

The first distillation tower 12 can be a packed tower. For example, ceramic Intalox saddles can be used as packing. Alternatively, the first distillation tower 12 can be a plate tower or any other distillation tower.

The first distillation tower 12 can be operated under reflux and reboiling conditions. Reflux refers to the process by which the gas stream 27 is fed to a condenser 28 and partially condensed. The portion of the gas stream 27 that is condensed is fed back to the top of the first distillation tower 12 as reflux 29. The portion of the gas stream 27 that is not condensed is preferably sent to a lime kiln in the pulp mill.

Reboiling refers to the process whereby liquid reaching the bottom of the tower is partially vaporized in a heated reboiler 30 to provide reboil vapor 31 which is sent back up the tower. The liquid that reaches the bottom of the tower is comprised of mostly water and methanol and possibly small amounts of other compounds that may have condensed inside the tower. The reboiler is operated at a temperature sufficiently hot so that the liquid stream 26 contains most of the methanol originally in the vapors and the gas stream 27 contains most of the dimethyl disulfide originally in the vapors. If the reboiler is too hot, no separation will occur, and all of the vapors will be removed with the gas stream. If the reboiler is not hot enough, no separation will occur, and all of the vapors will be removed with the liquid stream. The process of reboiling can consist of injecting steam directly into the tower, using an external heater, or using a heating coil inserted into the tower itself. Reboiling can also occur when the vapor introduction point 23 is at the same point as where the reboil vapor 31 is injected into the first tower 12, such that reboiling occurs when the vapors 22 are heated and directly injected into the bottom of the first tower 12. The reboiler 30 is preferably at the bottom of the first tower 12, so that the reboil vapor 31 is fed to the bottom of the first tower 12.

Figure 2:
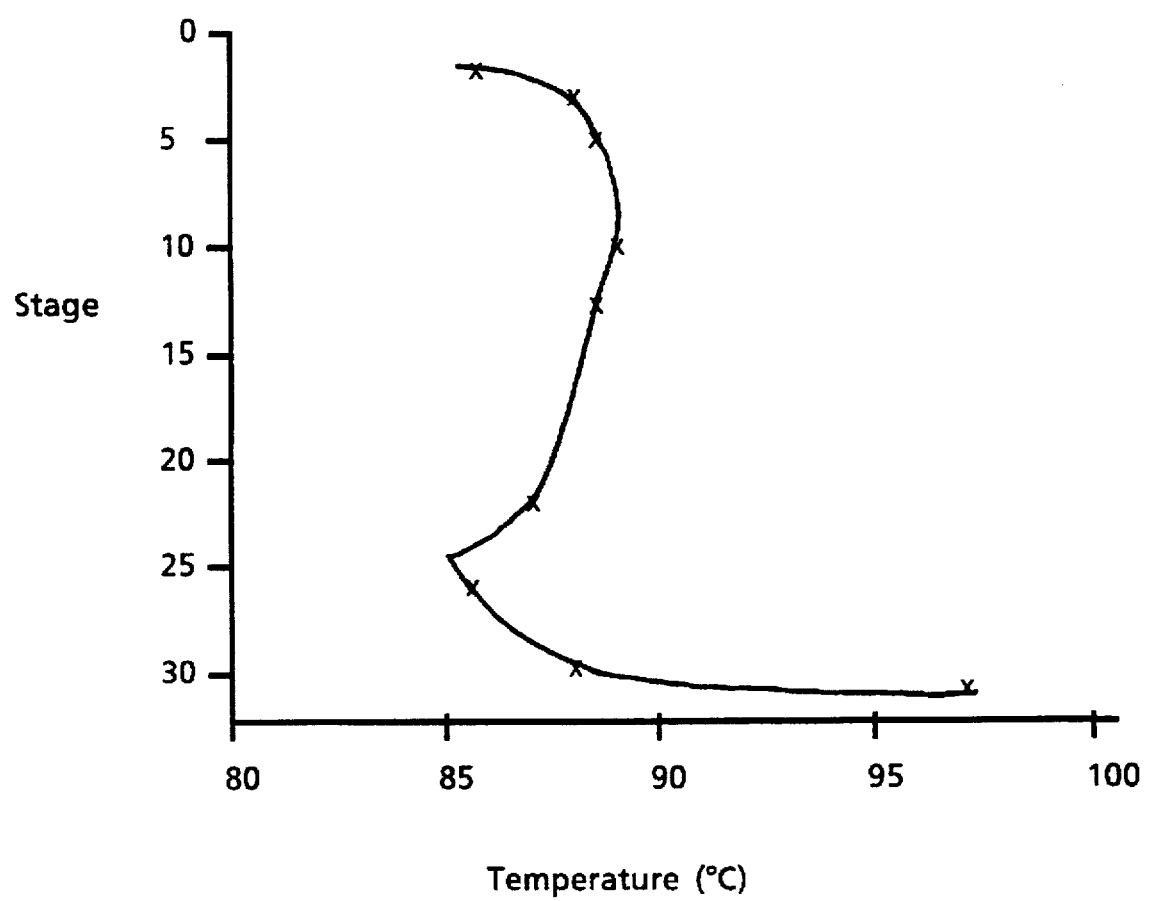
FIG. 2 is an example of the temperature profile in the first distillation tower.

Referring now to FIG. 2, therein is shown an example of the temperature profile throughout the first distillation tower 12. The stages are shown on the y axis, while the temperature is shown on the x axis. Stage one is the condenser 28, stage two is at the top of the first tower 12, and stage thirty-two is at the bottom of the first tower 12. The temperature is relatively low at the top of the first tower, because that is where the water, at ambient temperature, is introduced to the first tower 12. The feed stage, or vapor introduction point, is at stage twenty-four. The feed in FIG. 2 is a liquid, i.e., the vapors 22 having been condensed. Therefore, a temperature drop is observed at the feed point, or vapor introduction point. The temperature is very high at the bottom of the tower, because that is where the liquid inside the tower is heated by the reboiler.

The temperature inside the first distillation tower 12 depends upon various factors. For example, the amount of heat added to the heated reboiler 30, the temperature of the water 24 added to the first tower 12, and the introduction of liquid versus vapor to the vapor introduction point 23 are some of the factors that will affect the temperature inside the first tower 12. The pressure inside the tower is preferably about atmospheric pressure.

Referring again to FIG. 1, the liquid stream 26 is passed to a second distillation tower 13 for distillation. The liquid stream 26 is comprised mostly of water and methanol. Conventional distillation is an appropriate procedure for drying the methanol so that the methanol can be used for other purposes. This process of distilling the methanol using conventional distillation is also referred to herein as "methanol drying" because the purpose is to remove water from the methanol.

The second tower 13 can be a packed tower or a plate tower. The number of stages in the second tower 13 depends on the composition of the liquid stream 26 and the desired purity of the methanol. The design of distillation towers is described in "Chemical Engineers' Handbook" by Perry and Chilton.

The second distillation tower 13 is preferably operated such that methanol comes off the top of the tower as overheads 32 and water comes off the bottom of the tower as bottoms 33. The overheads 32 can be condensed in condenser 34. A portion of the condensed material is preferably fed back into the second tower 13 as reflux 35. The portion of the condensed material that is not refluxed is the resulting dry methanol 36. The dry methanol 36 can be fed over to other parts of the paper mill, such as the bleaching process. The purity of the dry methanol 36 depends upon the operating parameters selected for the first distillation tower 12 and the second distillation tower 13, and the purity can approach one hundred percent.

Preferably, the liquid reaching the bottom of the second tower 13 is partially vaporized in a heated reboiler 37 to produce reboil vapor 38 that is fed back to the second tower 13. The portion of the liquid reaching the bottom of the second tower 13 that is not vaporized is preferably removed as bottoms 33. The bottoms 33 comprises mostly water and possibly small amounts of other compounds that were not removed from the vapors 22.

Since the bottoms 33 comprises mostly water, the bottoms 33 can be fed to the first distillation tower 12 for extractive distillation purposes. The bottoms 33 can contain impurities, such as, for example, phenolics. A portion of the bottoms 33 is preferably purged so as to avoid build-up of the impurities in the water that is fed to the first distillation tower 12.

Referring now again to FIG. 1, the reboiler 30 can be eliminated by introducing the vapors 22 at a temperature sufficiently hot so that the liquid stream 26 contains most of the methanol originally in the vapors and the gas stream 27 contains most of the dimethyl disulfide originally in the vapors. In other words, the heat introduced by the reboiler 30 can, in another embodiment of the invention, be introduced with the vapors 22.

Figure 3:
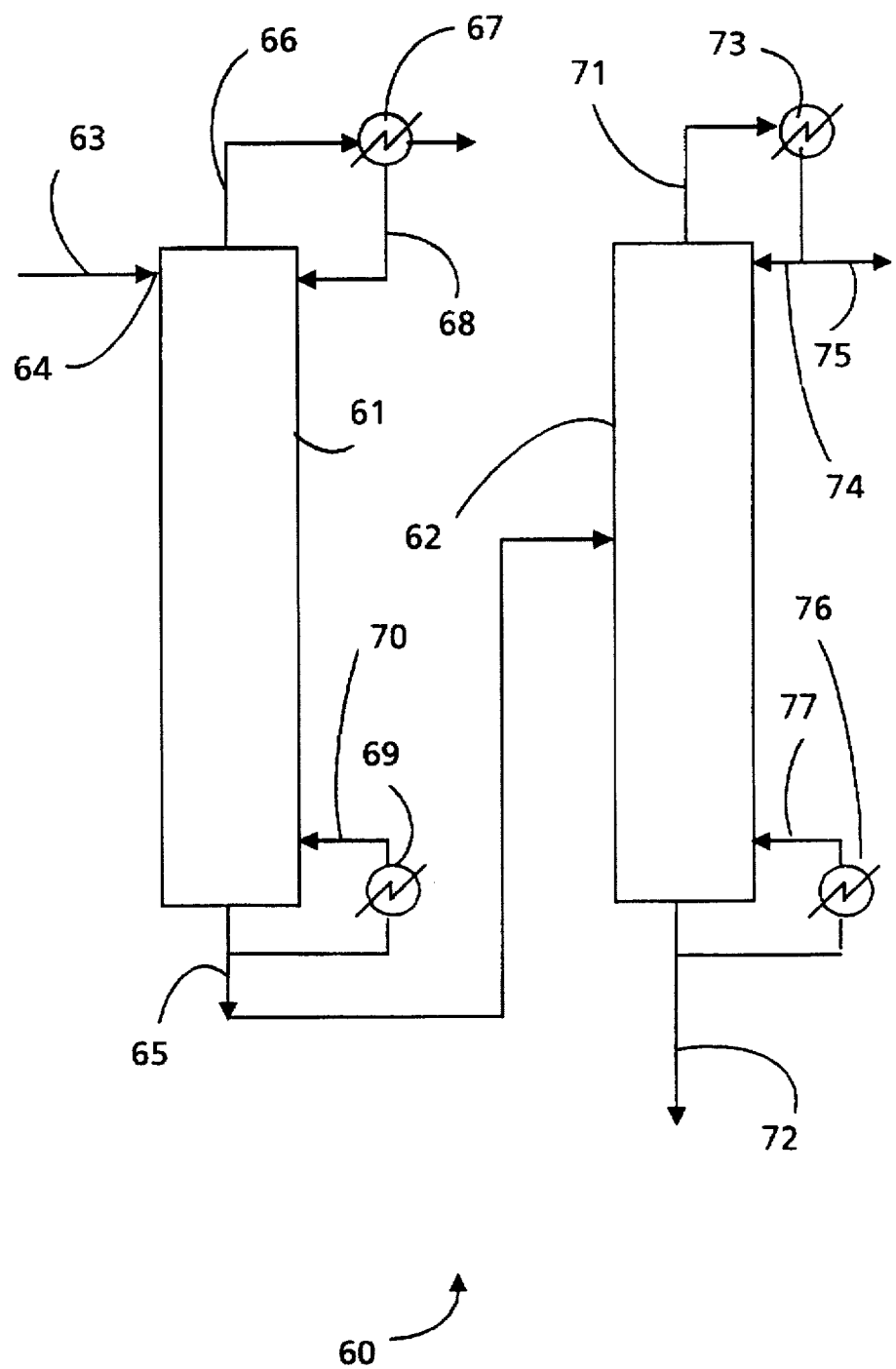
FIG. 3 is a schematic drawing of an alternative apparatus that can be used to practice the instant invention.

Referring now to FIG. 3, therein is shown a schematic drawing of an alternative process 60 that can be used to practice the instant invention. Preferably, the process 60 involves two unit operations: distillation in a first distillation tower 61, and conventional distillation, also known as methanol drying, in a second distillation tower 62. The instant invention will be described as it relates to the kraft process.

Vapors 63 are fed to a vapor introduction point 64 of the first distillation tower 61. Preferably, the vapors contain more than sixty weight percent water.

The vapors 63 are fed to the first distillation tower 61 at a vapor introduction point 64. The vapor introduction point 64 is at the top of the first distillation tower 61. More detail in determining the appropriate size and number of stages in a distillation tower is found in "Chemical Engineers' Handbook", by Perry & Chilton.

In the first distillation tower 61, distillation is performed so that water and most of the methanol originally in the vapors 63 come out of the bottom of the tower as a liquid stream 65, and most of the other compounds originally in the vapors 63, including dimethyl disulfide, come out of the top of the first tower 61 as a gas stream 66.

The first distillation tower 61 can be a packed tower. For example, ceramic Intalox saddles can be used as packing. Alternatively, the first distillation tower 61 can be a plate tower or any other distillation tower.

The first distillation tower 61 can be operated under reflux and reboiling conditions. Reflux refers to the process by which the gas stream 66 is fed to a condenser 67 and partially condensed. The portion of the gas stream 66 that is condensed is fed back to the top of the first distillation tower 61 as reflux 68. The portion of the gas stream 66 that is not condensed is preferably sent to a lime kiln in the pulp mill.

Reboiling refers to the process whereby liquid reaching the bottom of the tower is partially vaporized in a heated reboiler 69 to provide reboil vapor 70 which is sent back up the tower. The liquid that reaches the bottom of the tower is comprised of mostly water and methanol and possibly small amounts of other compounds that may have condensed inside the tower. The process of reboiling can consist of injecting steam directly into the tower, using an external heater, or using a heating coil inserted into the tower itself. The reboiler 69 is preferably at the bottom of the first tower 61, so that the reboil vapor 70 is fed to the bottom of the first tower 61.

Preferably, the liquid stream 65 is passed to a second distillation tower 62 for distillation. The liquid stream 65 is comprised mostly of water and methanol. Conventional distillation is an appropriate procedure for drying the methanol so that the methanol can be used for other purposes. This process of distilling the methanol using conventional distillation is also referred to herein as "methanol drying" because the purpose is to remove water from the methanol.

The second tower 62 can be a packed tower or a plate tower. The number of stages in the second tower 62 depends on the composition of the liquid stream 65 and the desired purity of the methanol. The design of distillation towers is described in "Chemical Engineers' Handbook" by Perry and Chilton.

The second distillation tower 62 is preferably operated such that methanol comes off the top of the tower as overheads 71 and water comes off the bottom of the tower as bottoms 72. The overheads 71 can be condensed in condenser 73. A portion of the condensed material is preferably fed back into the second tower 62 as reflux 74. The portion of the condensed material that is not refluxed is the resulting dry methanol 75. The dry methanol 75 can be fed over to other parts of the paper mill, such as the bleaching process. The purity of the dry methanol 75 depends upon the operating parameters selected for the first distillation tower 61 and the second distillation tower 62, and the purity can approach one hundred percent.

Preferably, the liquid reaching the bottom of the second tower 62 is partially vaporized in a heated reboiler 76 to produce reboil vapor 77 that is fed back to the second tower 62. The portion of the liquid reaching the bottom of the second tower 62 that is not vaporized is preferably removed as bottoms 72. The bottoms 72 comprises mostly water and possibly small amounts of other compounds that were not removed from the vapors 63.

EXAMPLES 1 AND 2

Extractive distillation and methanol drying are performed using the above described process in a small demonstration unit.

Extractive Distillation

For the extractive distillation portion of the methanol recovery method, the tower is a two inch diameter, sixteen foot high distillation tower with fifteen feet of packing (twenty-one pounds of ¼ inch ceramic Intalox saddles, packed under water). The vapors are introduced to the column at a point 11.5 feet from the top of the packing. The water and reflux enter the column above the packing. The pressure at the top of the column is about ambient pressure, or one atmosphere. Temperatures are measured at several points in the tower.

The condenser, used to condense a portion of the gas stream coming out of the top of the tower, is about six inches in diameter and about 21.5 inches in overall length. Cooling water circulates through copper tubing surrounding the condenser in order to cool the condenser. The flow rate of the cooling water is varied to control the temperature of the condenser. The condensed gas stream that is not sent back to the tower as reflux is collected in a distillate receiver that is traced with copper tubing for optional cooling of the condensed gas stream. Water flows through the copper tubing to cool the distillate receiver.

The external reboiler is about four inches in diameter and about nineteen inches in overall length. The reboiler is heated with DOWTHERM G brand heat transfer fluid, which circulates through about 6.5 feet of ⅜ inch outside diameter Hastelloy C tubing. The area is about 92 square inches (0.64 square feet). The DOWTHERM G brand heat transfer fluid is heated in 1.5 kilowatt heater before circulating through the tubing (Watlow, #CBEN19A6, Incoloy sheath, 23 W/in$^2$ capacity). The temperature of the liquid inside the reboiler is monitored. Thus, in Example 1, a reboiler heat duty of about 5630 BTU/hour corresponds to a temperature inside the reboiler of about 95.8 degrees centigrade. The liquid stream that comes out of the bottom of the tower is circulated through the reboiler, and a portion of the heated liquid is vaporized and sent back to the tower as reboil vapor. The temperature of the reboil vapor reentering the tower is measured at the outlet of the reboiler.

Samples of the vapors, the liquid stream and the gas stream are analyzed by gas chromatography using a Hewlett-Packard model 5890 Gas Chromatograph with a model 3396A integrator. Organics and water are analyzed at weight percent levels using a thermal conductivity detector (TCD) with a Poraplot-Q capillary column (25 meters long, 0.32 millimeter internal diameter) at nine pounds per square inch (psi) head pressure and 185 millimeters per minute (ml/min) split flow. Trace organics are measured at part per million (ppm) quantities using a flame ionization detector (FID) with a Poraplot-Q column (25 meters long, 0.53 millimeter internal diameter) at fourteen psi head pressure and 33 ml/min split flow.

Table II summarizes the results of the extractive distillation portion of the methanol recovery method for Examples 1 and 2. The resulting methanol recovery from the original vapors is in the range of about 90% to about 99%.

TABLE II

Extractive Distillation

| Variable | Example 1 | Example 2 |
|---|---|---|
| Vapors Feed Rate (pounds/hour) | 0.86 | 7.0 |
| Solvent (water) Feed Rate (pounds/hour) | 10 | 3.5 |
| Liquid Stream Rate (pounds/hour) | 0.015 | |
| Gas Stream Rate Rate (pounds/hour) | 10.98 | |
| Reflux Ratio | 50 | 25 |
| Reboiler Duty (BTU/hour) | 5630 | 4600 |
| Feed Composition (weight %): | | |
| Water | 48.67 | 96.90 |
| Methanol | 50.04 | 2.92 |
| Ethanol | 0.454 | 0.18 |
| Acetone | 0.502 | 51 ppm |
| Dimethyl Disulfide | 0.204 | 10 ppm |
| MIBK | 0.101 | 0.74 ppm |
| Liquid Stream Composition: | | |
| Water (wt %) | 95.98 | 98.17 |
| Methanol (wt %) | 4.02 | 1.83 |
| Ethanol (ppm) | 51.6 | 32 |
| Gas Stream Composition (wt %): | | |
| Water | 34.21 | 30.43 |
| Methanol | 39.13 | 59.99 |
| Ethanol | 8.03 | 9.26 |
| Acetone | 9.36 | 0.25 |
| Dimethyl Disulfide | 6.74 | not detected at 1 ppm |
| Methyl Isobutyl Ketone (MIBK) | 2.52 | 0.069 |

Methanol Drying

For the methanol drying portion of the methanol recovery method, the equipment is the same equipment used for extractive distillation. For Example 1, the system is drained of any excess material. However, for Example 2, after completing the extractive distillation, the packed tower, the reboiler, the condenser, the distillate receiver, and all associated piping are cleaned by distilling water for several hours to eliminate most of the other materials from the system.

For both Example 1 and Example 2, the liquid stream is fed to the distillation tower at about 4.5 feet from the top of the packing. The composition of the feed to the second tower is close to the composition of the liquid stream from the extractive distillation portion of the method, shown above in Table II. The reboiler is operated at about 8092 BTU/hour for Example 1, which corresponds to a temperature inside the reboiler of about 99.8 degrees centigrade. The resulting overheads coming out of the top of the tower contain mostly methanol, while the bottoms coming off the bottom of the tower contain mostly water. Table III summarizes the results from the methanol drying for Examples 1 and 2. The overall methanol recovery for methanol drying using conventional distillation is between about 90% and 99%.

TABLE III

Methanol Drying

| Variable | Example 1 | Example 2 |
|---|---|---|
| Feed Rate (pounds per hour) | 11.01 | 10.5 |
| Reflux Ratio | 13.3 | 11.5 |
| Reboiler Duty (BTU/hour) | 8092 | 6720 |
| Overheads Composition: | | |
| Water (wt %) | 0.040 | 0.23 |
| Methanol (wt %) | 99.84 | 99.71 |
| Ethanol (ppm) | 1180 | 677 |
| Acetone (ppm) | 25.6 | 10.9 |
| Dimethyl Disulfide (ppm) | 4.2 | 36.4 |
| MIBK (ppm) | 33.6 | 4.6 |

What is claimed is:

1. A method for recovering methanol from sulfur-based pulping process vapors, comprising the steps of:
   (a) introducing sulfur-based pulping process vapors containing at least methanol, ethanol and dimethyl disulfide into a first extractive distillation tower at a vapor introduction point;
   (b) introducing water into the first tower at a point above the vapor introduction point so that an aqueous phase containing more than sixty percent water is present above the vapor introduction point; and
   (c) heating the first tower at a point below the vapor introduction point so that a liquid stream flows from the bottom of the first tower and a gas stream flows from the top of the first tower, the liquid stream containing most of the methanol originally in the vapors, the gas stream containing most of the dimethyl disulfide and most of the ethanol originally in the vapors.

2. The method of claim 1, wherein in step (c), the first tower is heated at the bottom.

3. The method of claim 2 wherein the vapors are introduced as condensed vapors.

4. The method of claim 3, wherein the sulfur-based pulping process is a kraft pulping process.

5. The method of claim 2, wherein the sulfur-based pulping process is a kraft pulping process.

6. The method of claim 1,, further comprising:
   (d) passing the liquid stream from the bottom of the first tower to a second distillation tower; and
   (e) distilling the methanol from the liquid stream with the second tower.

7. The method of claim 6 wherein the vapors are introduced as condensed vapors.

8. The method of claim 7, wherein the sulfur-based pulping process is a kraft pulping process.

9. The method of claim 6, wherein the sulfur-based pulping process is a kraft pulping process.

10. The method of claim 1 wherein the vapors are introduced as condensed vapors.

11. The method of claim 10, wherein the sulfur-based pulping process is a kraft pulping process.

12. The method of claim 1, wherein the sulfur-based pulping process is a kraft pulping process.

13. A method for recovering methanol from sulfur-based pulping process vapors, comprising the steps of:
   (a) introducing sulfur-based pulping process vapors containing at least methanol, ethanol, dimethyl disulfide, and more than sixty percent water into a first extractive distillation tower at a vapor introduction point; and
   (b) heating the first tower at a point below the vapor introduction point so that a liquid stream flows from the bottom of the first tower and a gas stream flows from the top of the first tower, the liquid stream containing most of the methanol originally in the vapors, the gas stream containing most of the dimethyl disulfide and most of the ethanol originally in the vapors.

14. The method of claim 13, further comprising:

(c) passing the liquid stream from the bottom of the first tower to a second distillation tower; and (d) distilling the methanol from the liquid stream with the second tower.

15. The method of claim 14 wherein the vapors are introduced as condensed vapors.

16. The method of claim 15, wherein the sulfur-based pulping process is a kraft pulping process.

17. The method of claim 14, wherein the sulfur-based pulping process is a kraft pulping process.

18. The method of claim 13 wherein the vapors are introduced as condensed vapors.

19. The method of claim 18, wherein the sulfur-based pulping process is a kraft pulping process.

20. The method of claim 13, wherein the sulfur-based pulping process is a kraft pulping process.

21. A method for recovering methanol from sulfur-based pulping process vapors, comprising the steps of:

(a) introducing water into a first extractive distillation tower at a water introduction point of the tower so that an aqueous phase is present above the water introduction point of the tower; and (b) introducing sulfur-based pulping process vapors containing at least methanol, ethanol and dimethyl disulfide into the first distillation tower at point below the water introduction point of the tower, the vapors being sufficiently hot so that a liquid stream flows from the bottom of the first tower and a gas stream flows from the top of the first tower, the liquid stream containing most of the methanol originally in the vapors, the gas stream containing most of the dimethyl disulfide and most of the ethanol originally in the vapors.

22. The method of claim 21, wherein the vapors also contain ethanol, and wherein in step (a) sufficient water is introduced so that the concentration of water in the aqueous phase is greater than sixty weight percent so that the gas stream contains most of the ethanol originally in the vapors.

23. The method of claim 22, further comprising:

(d) passing the liquid stream from the bottom of the first tower to a second distillation tower; and (e) distilling the methanol from the liquid stream with the second tower.

24. The method of claim 23, wherein the sulfur-based pulping process is a kraft pulping process.

25. The method of claim 22, wherein the sulfur-based pulping process is a kraft pulping process.

26. The method of claim 21, further comprising:

(d) passing the liquid stream from the bottom of the first tower to a second distillation tower; and (e) distilling the methanol from the liquid stream with the second tower.

27. The method of claim 26, wherein the sulfur-based pulping process is a kraft pulping process.

28. The method of claim 21, wherein the sulfur-based pulping process is a kraft pulping process.

* * * * *